(12) United States Patent
Pals

(10) Patent No.: US 10,466,424 B2
(45) Date of Patent: Nov. 5, 2019

(54) SOLUTION FOR INSTALLING AN IN-HOUSE OR IN-BUILDING OPTICAL DATA NETWORK

(71) Applicant: Innovience International BV, Tilburg (NL)

(72) Inventor: Ludovicus Quirinus Maria Pals, Loon op Zand (NL)

(73) Assignee: Innovience International BV, Tilburg (NL)

( * ) Notice: Subject to any disclaimer, the term of this patent is extended or adjusted under 35 U.S.C. 154(b) by 0 days.

(21) Appl. No.: 15/316,139

(22) PCT Filed: Jun. 4, 2015

(86) PCT No.: PCT/NL2015/050404
§ 371 (c)(1),
(2) Date: Dec. 2, 2016

(87) PCT Pub. No.: WO2015/187017
PCT Pub. Date: Dec. 10, 2015

(65) Prior Publication Data
US 2017/0146746 A1    May 25, 2017

(30) Foreign Application Priority Data
Jun. 5, 2014  (NL) .................................. 2012956

(51) Int. Cl.
*G02B 6/38* (2006.01)
*G02B 6/44* (2006.01)
(Continued)

(52) U.S. Cl.
CPC ......... *G02B 6/3817* (2013.01); *G02B 6/4466* (2013.01); *H01R 13/447* (2013.01); *H01R 24/76* (2013.01); *H01R 31/06* (2013.01)

(58) Field of Classification Search
None
See application file for complete search history.

(56) References Cited

U.S. PATENT DOCUMENTS 5,033,112 A    7/1991  Bowling et al.
5,659,650 A *  8/1997  Arnett .................. G02B 6/3817
                                                  385/135
(Continued)

FOREIGN PATENT DOCUMENTS

DE    10238295 A1 * 11/2003 ............. H04B 10/27
EP     0753773 A1 *  1/1997 ........... G02B 6/3817
(Continued)

OTHER PUBLICATIONS

Formal translation of Ernst et al. (DE 10238295 A1).*

*Primary Examiner* — Ryan A Lepisto
*Assistant Examiner* — Erin D Chiem
(74) *Attorney, Agent, or Firm* — Patent Law Works LLP

(57) ABSTRACT

The invention provides a cover plate (10) of a socket outlet for providing electrical power to an electrical appliance. The cover plate comprises one or more holes (11,12) for receiving one or more POF cables (30). The hole has a diameter matching the diameter of the POF cable such that the POF cable is frictionally fixable in the hole when inserted into the hole. Furthermore an optical device is provided that is insertable into the socket outlet. The optical device can receive power from the socket outlet. The optical device comprises one or more holes aligned with the holes in the cover plate for making an optical data connection with the POF cables.

18 Claims, 4 Drawing Sheets

(51) Int. Cl.
*H01R 31/06* (2006.01)
*H01R 13/447* (2006.01)
*H01R 24/76* (2011.01)

(56) References Cited

U.S. PATENT DOCUMENTS

| | | | | |
|---|---|---|---|---|
| 5,696,861 | A * | 12/1997 | Schimmeyer | G02B 6/3817 |
| | | | | 385/75 |
| 6,927,340 | B1 * | 8/2005 | Binder | H02G 3/126 |
| | | | | 174/66 |
| 8,175,463 | B2 * | 5/2012 | Elberbaum | G08C 23/06 |
| | | | | 398/141 |
| 2003/0053739 | A1 * | 3/2003 | Boden | G02B 6/3897 |
| | | | | 385/15 |
| 2004/0000816 | A1 * | 1/2004 | Khoshnood | G02B 6/3817 |
| | | | | 307/149 |
| 2007/0286560 | A1 * | 12/2007 | Nakamura | G02B 6/02038 |
| | | | | 385/124 |
| 2009/0247006 | A1 * | 10/2009 | Thompson | H02G 3/121 |
| | | | | 439/527 |
| 2011/0110673 | A1 | 5/2011 | Elberbaum | |
| 2015/0078740 | A1 * | 3/2015 | Sipes, Jr. | H04B 10/808 |
| | | | | 398/16 |
| 2015/0280410 | A1 * | 10/2015 | Elberbaum | H02G 3/18 |
| | | | | 361/679.01 |

FOREIGN PATENT DOCUMENTS

| | | | | |
|---|---|---|---|---|
| EP | 0833425 A2 | 4/1998 | | |
| EP | 1792218 B1 | 6/2007 | | |
| WO | 2006032345 A1 | 3/2006 | | |
| WO | WO 2006032345 A1 * | 3/2006 | | G02B 6/3817 |
| WO | 2009086632 A1 | 7/2009 | | |

* cited by examiner

SOLUTION FOR INSTALLING AN IN-HOUSE OR IN-BUILDING OPTICAL DATA NETWORK

CROSS REFERENCE TO RELATED APPLICATIONS

This application is a National Stage of International Application No. PCT/NL2015/050404 filed Jun. 4, 2015, entitled "SOLUTION FOR INSTALLING AN IN-HOUSE OR IN-BUILDING OPTICAL DATA NETWORK", which claims priority to the Netherlands Application 2012956 filed Jun. 5, 2014, all of which are hereby incorporated by reference in their entirety.

FIELD OF THE INVENTION

The invention relates to in-house or in-building optical data networks. More specifically the invention relates to a cover plate of a socket outlet, a socket outlet for providing electrical power to an electrical appliance, an optical device for converting an optical signal into an electrical signal or processing the optical signal, and an in-house or in-building optical network.

BACKGROUND

High bandwidth in-house or in-building data networks may be achieved by installing Ethernet cables or optical fibers for transporting data.

Because of (safety) regulation and electro-magnetic interference Ethernet cables are not allowed to be installed along electrical wires, although the tubing of the electrical wires may have enough space for additional cables. Disadvantageously this means that separate tubing is to be installed for the Ethernet cables if such network were to be installed fixed and out-of-view. Furthermore, connecting an Ethernet cable to an Ethernet wall socket is difficult and time consuming as it requires special skills and equipment.

Optical fibers do not suffer from electro-magnetic interference and may be installed within the same tubing as the electrical wires. As with Ethernet cables, connecting an optical fiber to an optical wall socket is difficult as it requires special skills and equipment. Glass optical fibers are particularly difficult to install as they are difficult to cut and connect, and one has to be careful not to damage the end of the fiber.

Compared to wired data networks, wireless network alternatives are considered less favorable as wireless signals are more susceptible to interference from other signal sources and generally have a lower and less reliable bandwidth.

There is a need for a solution enabling installation of in-house or in-building high bandwidth data networks more easily.

SUMMARY OF THE INVENTION

A high bandwidth in-house or in-building network is achieved by installing plastic optical fibers (POF) for transporting data via optical signals, possibly co-located with electrical wiring sharing the same tubing. The optical signals transported via POF cables are insusceptible to interference by other signal sources, as is the case with e.g. a WiFi signal that may suffer interference from appliances or other WiFi signals transmitting on similar radio frequencies. Compared to glass optical fiber a POF is easier to handle, as it is more bendable without breaking and easier to cut without damaging the end of the cable at the cut. A downside of glass fiber cables has been that the installation thereof requires special skills and equipment for connecting the end of the fiber to the device where the optical signal is converted into an electrical signal (generally referred to as a "converter"). POF cables do not require such complicated connection to converters, but do require a fixed connection of the converter. The present invention provides a solution for easy and flexible installation of POF cables in combination with converters, without requiring special skills that allows quick and easy adding and removing converters to the termination points of a possibly large and prepared, passive POF network.

As mentioned, optical signals transported via POF cables are insusceptible to external interference. Moreover, the optical signals transported via POF cables do not suffer from general electro-magnetic interference from external signals or power lines. Because of this, it is allowed to install POF cables along electrical wires, such as power cables to socket outlets.

According to an aspect of the invention a cover plate of a socket outlet is proposed. The socket outlet is for providing electrical power to an electrical appliance. The cover plate comprises a hole for receiving a plastic optical fiber cable. The hole has at some point a diameter matching the diameter of the plastic optical fiber cable such that the plastic optical fiber cable is frictionally fixable in the hole when inserted into the hole.

The hole is to be understood as a hole completely through the cover plate from one side to the other side. There may be one, two or more holes depending on the number of POF cables installed at the socket outlet.

To install the POF cable at the socket outlet, the POF cable is inserted into the hole from the back side of the cover plate, i.e. from the side facing the socket outlet.

Advantageously, no special skills or equipment is needed for this.

Instead of a plastic optical fiber cable another optical fiber cable may be used having similar characteristics with respect to ease of cutting and bendability.

The cover plate may be fixed to the socket outlet or separable from the socket outlet.

An electrical appliance is any appliance that can be plugged into the socket outlet, either via a power plug and power cable or directly.

The cover plate comprises pin holes for receiving pins of the electrical appliance. In an embodiment the hole for receiving the POF cable is located in the same plane as the pin holes. This allows the POF cable to better fit the internals of the socket outlet and eases alignment of the hole with an optical device inserted into the socket outlet.

According to an aspect of the invention a socket outlet is proposed for providing electrical power to an electrical appliance. The socket outlet comprises the cover plate of any one of the above described embodiments.

Typically a socket outlet comprises two parts: an internal part and a cover plate. The internal part is typically installed in a wall or housing and the cover plate covers the internal part for safety (preventing touching electric parts) and aesthetic reasons. The socket outlet may be a wall socket, table mounted socket, part of a power strip, or used in any other configuration. The cover plate may be a fixed part of the socket outlet or separable from the socket outlet.

According to an aspect of the invention an optical device is proposed. The optical device is for converting an optical signal into an electrical signal and/or for processing the optical signal. The optical device is insertable into the socket outlet of any one of the above described embodiments. The optical device can receive power from the socket outlet when inserted into the socket outlet. The optical device comprises a hole for, when inserted into the socket outlet, retrieving and/or transmitting optical signals at the end to the plastic optical fiber cable in the hole of the cover plate. The hole in the optical device aligns with the hole in the cover plate when the optical device is inserted into the socket outlet. Thereby an optical circuit can be made between the optical device and the plastic optical fiber cable in the socket outlet.

Advantageously, to use optical signals transmitted via the POF cable, all one has to do is insert the optical device into the socket outlet. With the hole in the cover plate being aligned with the hole in the optical device, upon insertion of the optical device into the socket outlet an optical connection is established between the POF cable and the optical device allowing the optical device to receive and transmit optical signals.

Furthermore, the optical device can be powered by the socket outlet.

In an embodiment the optical device is one of: an Ethernet converter for converting an optical signal into an Ethernet signal and replicating the socket outlet; a WiFi converter for converting an optical signal into a WiFi signal and replicating the socket outlet; an Ethernet converter for converting an optical signal into an Ethernet signal without replicating the socket outlet; a WiFi converter for converting an optical signal into a WiFi signal without replicating the socket outlet; a motion detector for use in an alarm system; or a thermostat for use with a heating control system.

Thus, many appliances are possible. The invention is not limited to one of these embodiments; the optical device may be any other device insertable into the socket outlet and having a hole aligned with the hole in the cover plate of the socket outlet for creating an optical circuit.

According to an aspect of the invention an in-house or in-building optical network is proposed. The optical network comprises the socket outlet of any one of the above described embodiments. The optical network further comprises a plastic optical fiber cable installed along electrical wires connected to the socket outlet. The plastic optical fiber cable is inserted into the hole from the side of the cover plate facing the socket outlet such that the plastic optical fiber cable is frictionally fixed in the hole and not protruding the hole at the side facing away from the socket outlet.

One or more socket outlets may be part of the optical network. Thus an in-house or in-building optical network may be achieved without special skills or special equipment.

In an embodiment the plastic optical fiber cable and the electrical wires are at least partly installed in a single tubing. This allows the POF cable to be installed in the same tubing as the electric wires, thus there is no need for installing new tubing.

In an embodiment the optical network comprises the optical device of any one of the above described embodiments.

In an embodiment, when the optical device is inserted into the socket outlet there is a distance between the hole in the cover plate and the hole in the optical device while maintaining an optical circuit.

This allows the optical device not to be fully inserted into the socket outlet, irregularities on the surface of the cover plate or optical device causing the distance or small items, such as dirt or child safety inlays, in between the cover plate and optical device while maintaining the optical circuit.

In an embodiment the distance is less than 20 mm, ensuring that the optical circuit is maintained.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments of the invention shown in the drawings, in which.

DETAILED DESCRIPTION OF THE DRAWINGS

Figure 1:
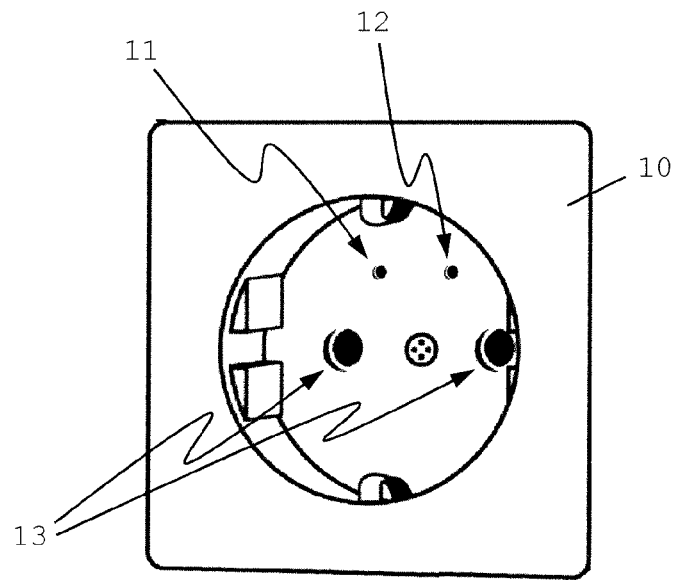
FIG. 1 shows a cover plate for a socket outlet of an exemplary embodiment of the invention.

FIG. 1 shows a cover plate 10 of a socket outlet of an exemplary embodiment of the invention. The socket outlet may be a standard socket outlet for providing electrical power to electric appliances, with the exception of one or more holes 11,12 being provided for or drilled through the cover plate 10 of the socket outlet. In FIG. 1 the socket outlet has a CEE 7 standard compliant form factor. Depending on the country of use, the form factor of the socket outlet may differ. The cover plate 10 may be separable from the socket outlet or an integral part of the socket outlet. A POF cable may be pulled through a plastic tubing that provides the power cable to the socket outlet. From the back of the cover plate 10 one end of a POF cable may be inserted into the hole 11,12, such that it does not protrude at the front side of the cover plate. The diameter of the holes 11,12 is preferably such that the POF cable becomes frictionally fixed in the hole when inserted. The other end of the POF cable typically ends at a hub near a router, switch or other optical network device, as will be explained with FIG. 7.

The cover plate 10 may have one hole if a single POF cable is used for data communication in two directions. In a preferred embodiment, such as shown in FIG. 1, the cover plate has two holes for installing two POF cables for data communication in two different directions, each POF cable handling one direction. More than two holes may be used for installing three or more POF cables, e.g. for allowing multiple data communication channels.

Figure 2:
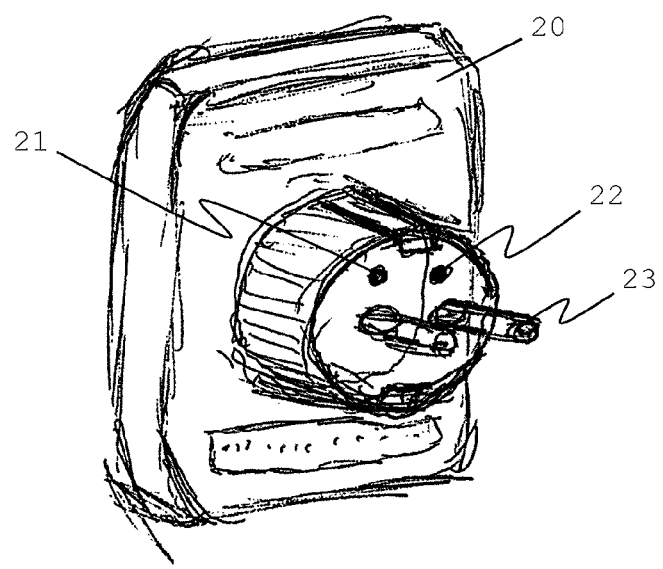
FIG. 2 shows an optical device for use in a socket outlet with a cover plate of an exemplary embodiment of the invention.

The location of each hole 11,12 is arbitrary, but is chosen such that the POF cable, when inserted in the hole 11,12 is not in the way of the internals of the socket outlet and the power cables in the socket outlet. Preferably the holes 11,12 and the pin holes 13 are located in the same plane. Furthermore, the holes 11,12 are to be aligned with a device using the optical signals when such device is inserted into the socket outlet. An example of such device is shown in FIG. 2. To have the one or more holes 11,12 drilled at the right place in the cover plate 10 in case those holes are not provided, a mold may be used that fits the cover plate 10 of the socket outlet and having one or more holes at the correct location for drilling through the mold hole(s) and thereby creating the holes 11,12 in the cover plate 10.

FIG. 2 shows an optical device 20 that may be inserted into the socket outlet for retrieving and transmitting optical signals at the end to the POF cable at the hole 11,12. One or more holes 21,22 in the device 20 align with the holes 11,12 in the cover plate 10 when the device is inserted into the socket outlet, thereby enabling an optical circuit between the device 20 and the POF cable at the socket outlet. Advantageously, the device 20 may use the power from the socket outlet together with the optical signals. Hereto the device 20 has two pins 23 for insertion into the socket outlet as a power plug.

Conversion of the optical signal to an electrical signal or processing of the optical signal may be performed within the device 20. Hereby the installation of the POF cable at the socket outlet becomes very easy, i.e. insertion of one end of a POF cable into the hole 11,12 is all there is to it. Furthermore, the device 20 is typically sold as a complete product, thus no knowledge of installing POF cables is needed when using the device 20.

Figure 3:
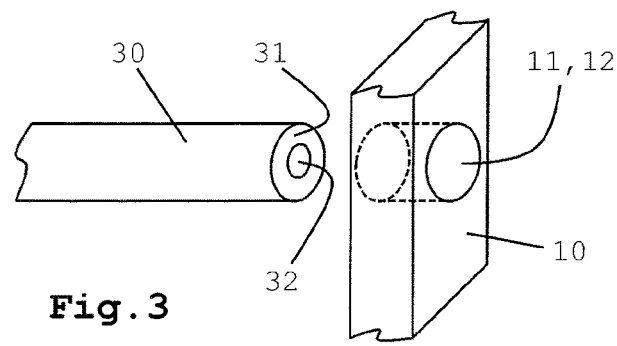
FIGS. 3 and 4 illustrate an installation of a POF cable at a cover plate.
Figure 4:
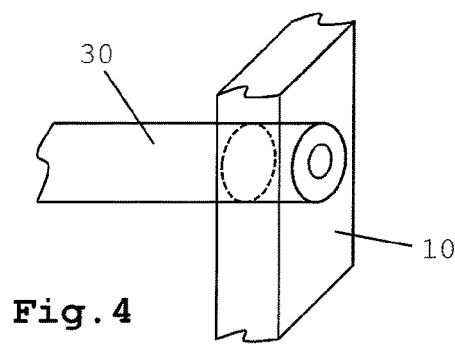

FIG. 3 and FIG. 4 illustrate how one end of a POF cable may be easily installed in a socket outlet. A POF cable 30 is shown having a protection layer 31 and a light conducting core 32, as known in the art. A part of a cover plate 10 is shown with one hole 11,12. In FIG. 3 the POF cable 30 is shown separated from the cover plate 10. The POF cable 30 is installed by inserting the POF cable 30 into the hole 11,12 as shown in FIG. 4. Preferably the POF cable 30 is inserted such that it does not protrude at the front of the cover plate 10, i.e. the side of the cover plate 10 that is visible when mounted on the socket outlet. The POF cable 30 is to be inserted into the hole 11,12 at least partly, preferably such that it becomes frictionally fixed in the hole 11,12.

Figure 5:
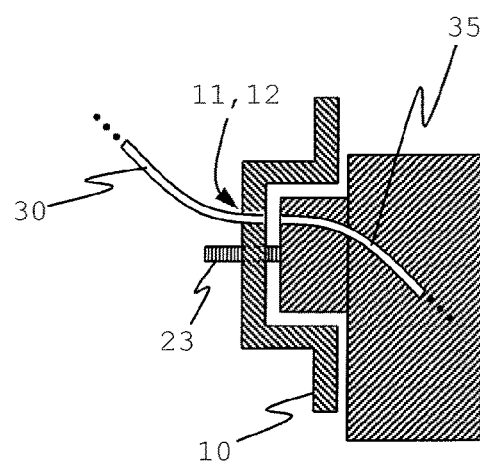
FIG. 5 shows a cross section of a cover plate and optical device.

FIG. 5 is an exemplary cross section of a cover plate 10 and a device 20. The cover plate 10 has a hole 11,12 at the location indicated by the arrow. One end of a POF cable 30 is inserted into the hole 11,12. An optical device 20 is plugged into the socket outlet, thus the pins 23 of the optical device 20 are inserted through the pin holes of the cover plate 10. Sufficiently aligned with the hole 11,12 and thus with the end of the POF cable 30 in the hole 11,12, an optical guide 35, such as a POF cable, inside the optical device 20 may end at a hole in the housing of the optical device 20. Inside the optical device 20 the other end of the optical guide 35, i.e. at the end indicated by the three dots, the optical guide 35 is typically connected to an electronic circuit (not shown) for converting optical signals into electrical signals or processing optical signals.

Figure 6:
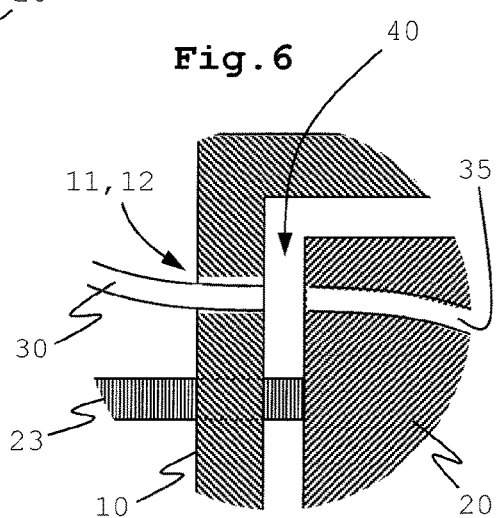
FIG. 6 shows an enlarged portion of FIG. 5.

FIG. 6 shows an enlarged portion of FIG. 5 to illustrate that in between the open end of the POF cable 30 inside the hole 11,12 and the open end of the POF cable 35 in the optical device 20 a space 40 may be present. The two ends of the POF cables 30,35 do not need to be connected or make contact for an optical circuit to be established. A maximum distance of 10 mm to 20 mm may be in between the two ends while maintaining the optical circuit. The acceptance of a space 40 allows the POF cable 30 to be not fully inserted into the hole 11,12. Furthermore, surface irregularities on the outer surface of the cover plate 10 or on the housing of the optical device 20 resulting in the optical device 20 not being fully insertable into the socket outlet are acceptable. Moreover, e.g. child protection inlays inserted into the cover plate preventing children from inserting items into the pin holes of the socket outlet may be used as the space 40 created by such inlay is typically below 10 mm.

Figure 7:
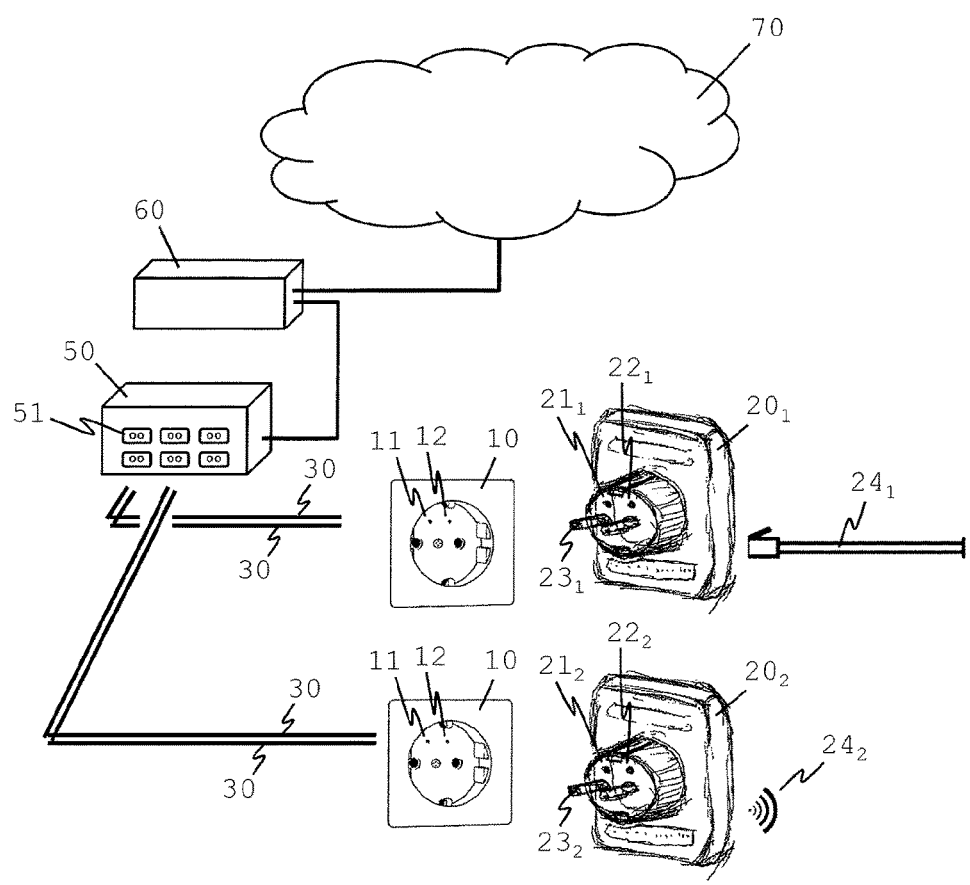
FIG. 7 shows an exemplary in-house optical network connected to another network.

Installing POF cables 30 along power cables to socket outlets enables an in-house or in-building optical network to be created. An example of an in-house optical network 1 connected to another network 70 is shown in FIG. 7. The network 70 may be a wide area network (WAN), such as the Internet. In this case a router 60 such as a cable modem router, ADSL modem router or fiber optic modem (FOM) connects the in-house optical network to the WAN. The network 70 may be a local area network (LAN), in which case a router 60 such as a LAN router connects the in-house optical network to the LAN. It is possible that the in-house optical network is not connected to another network 70. The router 60 is connected to a hub 50 of the in-house optical network. The hub 50 may also contain the functionality of the router 60, in which case no separate router is needed.

In the example of FIG. 7 pairs of POF cables 30 are used for two-way data communication. I.e., one POF cable 30 is used for data signals in the direction of the socket outlet and another POF cable 30 is used for data signals in the direction of the hub 50. At the socket outlet a first POF cable is inserted into a first hole 11 and a second POF cable is inserted into a second hole 12. As the hub the POF cable pairs are connected to a hub socket 51. Different POF cable pairs are thus connected to different hub sockets 51.

A first optical device $20_1$ may be used to convert the optical signals received via holes 11,12 and holes $21_1$ and $22_1$ into Ethernet signals when inserted into the socket outlet. The first optical device $20_1$ may have an RJ45 socket for receiving an RJ45-based Ethernet cable $24_1$ for connecting e.g. a computer device to the network. The first device $20_1$ may receive power from the socket outlet via pins $23_1$ when inserted into the socket outlet.

A second optical device $20_2$ may be used to convert the optical signals received via holes 11,12 and holes $21_2$ and $22_2$ into WiFi signals when inserted into the socket outlet. The second optical device $20_2$ may have an WiFi transceiver, indicated by $24_2$, for wirelessly connecting e.g. a computer device to the network. The second device $20_2$ may receive power from the socket outlet via pins $23_2$ when inserted into the socket outlet.

In a similar way, other optical device configurations may convert the optical data into standardized or non-standardized data protocols, such as Z-wave, Bluetooth, DECT, VoIP, GSM (effectively making the optical device a Pico-cell), and etcetera.

The socket outlet where the POF cable 30 is to be installed is typically away from the hub 50. To enable the end-user to connect one end of the POF cable 30 to the correct hub socket 51 and the other end of the POF cable 30 into the correct hole 11,12, the hub 50 may be configured to emit signals from the hub socket 51 currently being installed. Effectively this results in light being emitted from the hub socket 51. Upon insertion of the POF cable 30 into the hub socket 51 the other end of the POF cable 30, i.e. at the end of the cover plate 10, starts emitting the light allowing the end-user to identify the correct POF cable to be inserted into one of the holes 11,12.

The optical device 20 may be any device utilizing the optical signals and possibly being powered by the socket outlet. Non-limiting examples hereof are shown in FIGS. 8-13.

Figure 8:
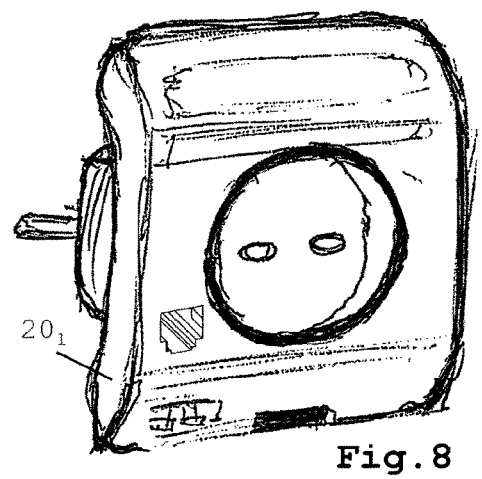
FIGS. 8-13 show different exemplary embodiments of optical devices.

FIG. 8 shows a first optical device $20_1$ for converting the optical signals into Ethernet signals. First optical device $20_1$ has an RJ45 socket for receiving an RJ45-based Ethernet cable. Furthermore, the first optical device $20_1$ replicates the socket outlet allowing further electrical appliances to be powered at the location of the socket outlet.

Figure 9:
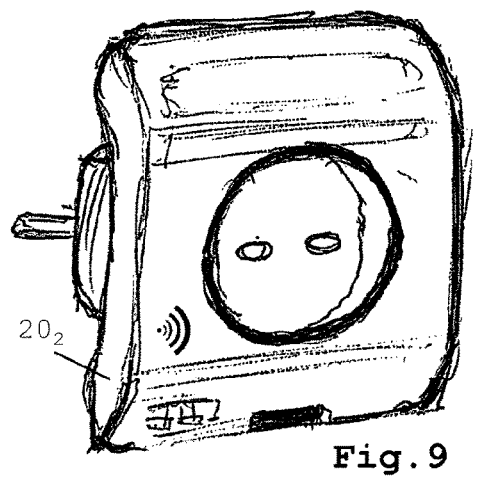

FIG. 9 shows a second optical device 20₂ for converting the optical signals into WiFi signals. Second optical device 20₂ has a WiFi transceiver for WiFi communication. Furthermore, the second optical device 20₂ replicates the socket outlet allowing further electrical appliances to be powered at the location of the socket outlet.

FIG. 9 shows a third optical device 20₃ for converting the optical signals into Ethernet signals. Third optical device 20₃ has two RJ45 sockets for receiving two RJ45-based Ethernet cables.

Figure 10:
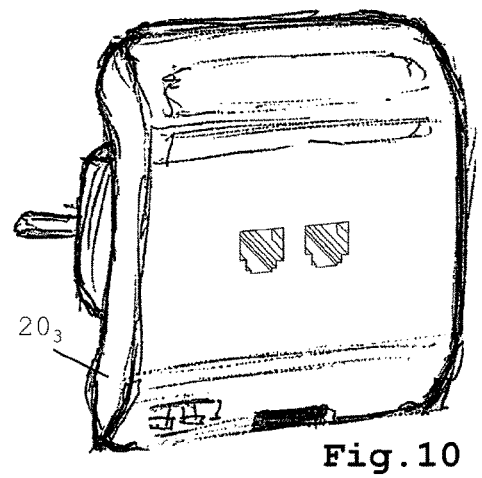

FIG. 10 shows a fourth optical device 20₄ for converting the optical signals into WiFi signals. Fourth optical device 20₄ has a WiFi transceiver for WiFi communication.

Figure 11:
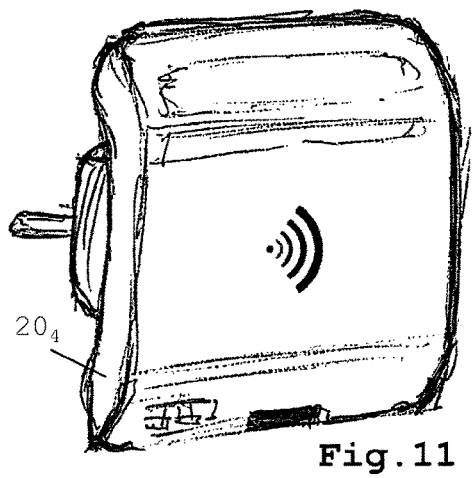

FIG. 11 shows a fifth optical device 20₅ with a motion detector for use in an alarm system. Motion detected by the detector may result in an optical signal being transmitted to a central processing device, e.g. connected to a hub 50.

Figure 12:
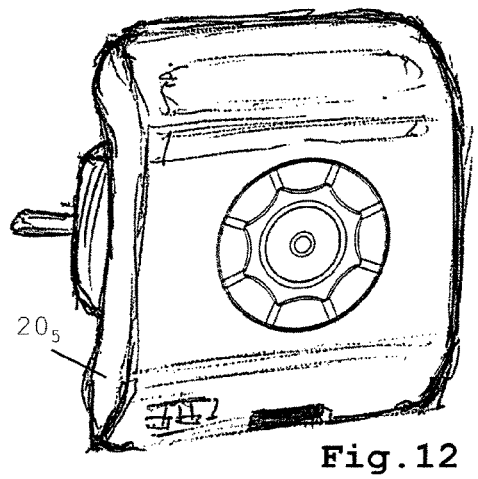
Figure 13:
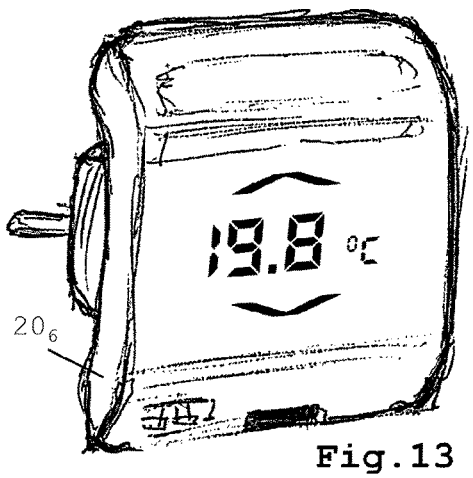

FIG. 12 shows a sixth optical device 20₆ with a thermostat and a user interface for setting a desired room temperature. The thermostat may be optically connected to a heating control system for controlling the heating of the house. The heating control system may be connected to a hub 50.

The invention claimed is:

1. A cover plate of a socket outlet for providing electrical power to an electrical appliance that comprises and optical guide for receiving and/or transmitting optical signals, the cover plate comprising:
a surface having a hole for receiving a plastic optical fiber cable from a back-side of the cover plate and pin holes for receiving pins of the electrical appliance from a front-side of the cover plate, wherein
the plastic optical fiber cable has a protection layer and a light conducting core, and
the hole has a diameter matching the diameter of the plastic optical fiber cable such that the plastic optical fiber cable is frictionally fixable in the hole by friction between an outer surface of the protection layer and a sidewall of the hole when the plastic optical fiber cable is inserted into the hole from the back-side of the cover plate such that, when the electrical appliance is plugged into the socket outlet, an open end of the plastic optical fiber cable and an open end of the optical guide are spatially separated yet are optically connected.

2. The cover plate according to claim 1, wherein the outer surface of the cable comprises a protection layer and the plastic optical fiber cable is frictionally fixable in the hole by friction between the protection layer of the cable and a sidewall of the hole when the plastic optical fiber cable is inserted into the hole.

3. The cover plate according to claim 1, wherein the hole is located in the same plane as the pin holes, and wherein the cover plate is separable from the socket outlet and the hole is located in a surface away from a center of the surface.

4. A socket system comprising:
a cover plate having:
a surface having a hole for receiving a plastic optical fiber cable from a back-side of the cover plate and pin holes for receiving pins of an electrical appliance from a front side of the cover plate, the electrical appliance comprising an optical guide for receiving and/or transmitting optical signals, wherein
the plastic optical fiber cable has a protection layer and a light conducting core, and
the hole has a diameter matching the diameter of the first plastic optical fiber cable such that the first plastic optical fiber cable is frictionally fixable in the hole by friction between an outer surface of the protection layer and a sidewall of the hole when the first plastic optical fiber cable is inserted into the hole from the back-side of the cover plate such that, when the optical device is plugged into the socket, an open end of the plastic optical cable and an open end of the optical guide are spatially separated yet are optically connected; and
a socket outlet for providing electrical power to an electrical appliance.

5. The socket system according to claim 4, further comprising:
an optical device for converting an optical signal into an electrical signal or processing the optical signal, the optical device being insertable into the socket outlet for receiving power from the socket outlet, wherein
the optical device comprises a hole for, when inserted into the socket outlet, retrieving and/or transmitting optical signals at the end to the plastic optical fiber cable in the hole of the cover plate, and wherein
the hole in the optical device aligns with the hole in the cover plate while having a space between the hole in the cover plate and the hole in the optical device when the optical device is inserted into the socket outlet, thereby enabling an optical circuit between the optical device and the plastic optical fiber cable in the socket outlet.

6. The optical device according to claim 5, wherein the optical device is one of: an Ethernet converter for converting an optical signal into an Ethernet signal and replicating the socket outlet; a WiFi converter for converting an optical signal into a WiFi signal and replicating the socket outlet; an Ethernet converter for converting an optical signal into an Ethernet signal without replicating the socket outlet; a WiFi converter for converting an optical signal into a WiFi signal without replicating the socket outlet; a motion detector for use in an alarm system; or a thermostat for use with a heating control system.

7. The socket system according to claim 4, wherein the socket system comprises an in-house or in-building optical network comprising a plastic optical fiber cable installed along electrical wires connected to the socket outlet, wherein the plastic optical fiber cable is inserted into the hole from the side of the cover plate facing the socket outlet such that the plastic optical fiber cable is frictionally fixed in the hole and not protruding the hole at the side facing away from the socket outlet.

8. The socket system according to claim 4, The cover plate according to claim 1, wherein the outer surface of the cable comprises a protection layer and the plastic optical fiber cable is frictionally fixable in the hole by friction between the protection layer of the cable and a sidewall of the hole when the plastic optical fiber cable is inserted into the hole.

9. The socket system according to claim 4, wherein the hole is located in the same plane as the pin holes, and wherein the cover plate is separable from the socket outlet and the hole is located in a surface away from a center of the surface.

10. The socket system according to claim 4, wherein the open end of the plastic optical fiber cable and the open end of the optical guide are separated by a distance of no more than 20 mm when the electrical device is plugged into the socket outlet.

11. An in-house or in-building optical network, comprising:
a cover plate having:
a surface having a hole for receiving a plastic optical fiber cable from a back-side of the cover plate and pin holes for receiving pins of an electrical appliance from a front-side of the cover plate, wherein
the plastic optical fiber cable has a protection layer and a light conducting core, wherein
the hole has a diameter matching the diameter of the plastic optical fiber cable such that the plastic optical fiber cable is frictionally fixable in the hole by friction between an outer surface of the protection layer and a sidewall of the hole when the plastic optical fiber cable is inserted into the hole from the back-side of the cover plate; and
a socket outlet for providing electrical power to an electrical appliance; and
a plastic optical fiber cable installed along electrical wires connected to the socket outlet, wherein the plastic optical fiber cable is inserted into the hole from the side of the cover plate facing the socket outlet such that the plastic optical fiber cable is frictionally fixed in the hole and not protruding the hole at the side facing away from the socket outlet.

12. The optical network according to claim 11, wherein the plastic optical fiber cable and the electrical wires are at least partly installed in a single tubing.

13. The optical network according to claim 11, further comprising an optical device for converting an optical signal into an electrical signal or processing the optical signal, the optical device being insertable into the socket outlet for receiving power from the socket outlet, wherein
the optical device comprises a hole for, when inserted into the socket outlet, retrieving and/or transmitting optical signals at the end to the plastic optical fiber cable in the hole of the cover plate, and wherein
the hole in the optical device aligns with the hole in the cover plate while having a space between the hole in the cover plate and the hole in the optical device when the optical device is inserted into the socket outlet, thereby enabling an optical circuit between the optical device and the plastic optical fiber cable in the socket outlet.

14. The optical network according to claim 13, wherein, when the optical device is inserted into the socket outlet, there is a distance between the hole in the cover plate and the hole in the optical device while maintaining an optical circuit.

15. The optical network according to claim 13, wherein the optical device is one of: an Ethernet converter for converting an optical signal into an Ethernet signal and replicating the socket outlet; a WiFi converter for converting an optical signal into a WiFi signal and replicating the socket outlet; an Ethernet converter for converting an optical signal into an Ethernet signal without replicating the socket outlet; a WiFi converter for converting an optical signal into a WiFi signal without replicating the socket outlet; a motion detector for use in an alarm system; or a thermostat for use with a heating control system.

16. The optical network according to claim 11, further comprising a hub, wherein different plastic optical fibers are connected to different hub sockets.

17. The in-house or in-building optical network according to claim 11, wherein the outer surface of the cable comprises a protection layer and the plastic optical fiber cable is frictionally fixable in the hole by friction between the protection layer of the cable and a sidewall of the hole when the plastic optical fiber cable is inserted into the hole.

18. The optical network according to claim 11, wherein the hole is located in the same plane as the pin holes, and wherein the cover plate is separable from the socket outlet and the hole is located in a surface away from a center of the surface.

* * * * *